(12) United States Patent
Edwards, II

(10) Patent No.: US 8,357,870 B1
(45) Date of Patent: Jan. 22, 2013

(54) INTELLIGENT STEPPER WELDING SYSTEM AND METHOD

(75) Inventor: Paul C. Edwards, II, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/728,821

(22) Filed: Mar. 22, 2010

(51) Int. Cl.
*B23K 11/00* (2006.01)

(52) U.S. Cl. .................................... 219/78.01

(58) Field of Classification Search ............ 219/78.01, 219/86.1, 86.41, 86.7, 87, 91.1, 91.2, 92, 219/108, 110, 111, 117.1, 118
See application file for complete search history.

(56) References Cited

U.S. PATENT DOCUMENTS

| | | | |
|---|---|---|---|
| 4,302,653 A | 11/1981 | Denning et al. | |
| 4,694,135 A | 9/1987 | Nagel et al. | |
| 4,885,451 A * | 12/1989 | Farrow et al. | ........... 219/110 |
| 4,963,707 A | 10/1990 | Zyokou et al. | |
| 5,276,308 A | 1/1994 | Hasegawa | |
| 5,436,422 A | 7/1995 | Nishiwaki et al. | |
| 5,440,092 A | 8/1995 | Kawai | |
| 5,483,035 A | 1/1996 | Kawai et al. | |
| 5,793,011 A | 8/1998 | Watanabe et al. | |
| 6,043,449 A | 3/2000 | Kanjo | |
| 6,156,992 A | 12/2000 | Besslein | |
| 6,506,997 B2 | 1/2003 | Matsuyama | |
| 2008/0237199 A1 | 10/2008 | Phillips | |

FOREIGN PATENT DOCUMENTS

JP 2008105041 5/2008

* cited by examiner

*Primary Examiner* — Jenny L Wagner

(74) *Attorney, Agent, or Firm* — Rankin Hill & Clark LLP

(57) ABSTRACT

An intelligent stepper system and method for controlling weld current in a welding operation includes a welder welding a plurality of spot welds in succession and a controller incrementally increasing the weld current by a first fixed amount or percentage at each of the plurality of spot welds. Weld spatter is sensed at each of the plurality of spot welds and weld current is decreased by a second fixed amount or percentage when weld spatter is sensed.

20 Claims, 4 Drawing Sheets

INTELLIGENT STEPPER WELDING SYSTEM AND METHOD

BACKGROUND

Exemplary embodiments herein relate to an intelligent stepper welding system and method for controlling weld current in a welding operation.

Spot welding is a commonly employed resistance welding technique used to join metallic work pieces. Spot welding operates by passing electric current through the work pieces to be joined. This causes a localized heating of the work pieces that is sufficient to produce a molten weld pool therebetween. Upon cooling, the weld pool forms a weld nugget that joins the work pieces. Spot welding, such as by automated robots, is often used to manufacture a body-in-white assembly on a vehicle assembly line.

As it is desirable to conduct the electric current as efficiently as possible, conducting electrodes are employed to contact the work pieces at the welding location. Although various conductive metals may be used, copper is commonly utilized in the manufacture of weld electrodes. Spot welding additionally requires that the weld electrodes be forcibly pressed against the work pieces during the welding process. As is known, the electrodes are prone to wear and/or damage during use (i.e., mushroom), particularly electrodes made of copper or another similar softer conductive material. For example, weld electrodes wear down and/or become deformed during use as the result of heat generated by the welding process, and also due the force the electrodes are required to exert the work pieces upon which they operate.

To keep the welding electrodes in satisfactory welding condition, the welding electrodes are typically subjected to a periodic cutting or shaping process commonly referred to as "tip dressing." This limits the overall amount of deformation or mushrooming of a weld electrode tip, but significant deformation can still occur between tip dressings. In a vehicle manufacturing line, one example tip dressing schedule requires the electrodes to be dressed approximately every twenty vehicles or vehicle bodies. Thus, if there were twenty welds per vehicle body that a welding electrode must perform, there could be upwards of 400 individual spot welds that are performed by the welding electrode between tip dresses (twenty vehiclextwenty spot welds). By way of example, a 6 millimeter tip face could deform or mushroom to approximately 8 millimeters in diameter, which would correspond to the facial area of the electrode tip increasing from about 28 mm² to around 50 mm².

One solution for dealing with deforming electrode tips between tip dresses is to crank up the initial welding current high enough such that individual spot welds are still satisfactory when the electrode tips deform, such as to 8 millimeters in diameter. Unfortunately, a side effect of such increased welding current is that weld spatter increases greatly, as does porosity of the welds. Another alternative is to increase the tip dress frequency for the electrodes, such as to approximately every three vehicles. However, this results in slower production of vehicle bodies and thus increased production costs.

SUMMARY

According to one aspect, an intelligent stepper method for controlling weld current in a welding operation includes welding a plurality of spot welds in succession, incrementally increasing the weld current by a first fixed amount or percentage at each of the plurality of spot welds, sensing weld spatter at each of the plurality of spot welds, and decreasing the weld current by a second fixed amount or percentage when weld spatter is sensed.

According to another aspect, an intelligent stepper welding system includes a resistance welding having opposed electrode tips for spot welding. A power source is operatively connected to the electrode tips for providing a weld current thereto. A sensor is included for measuring a voltage or resistance between the electrode tips. A controller is operatively connected to the sensor for receiving a voltage or resistance signal therefrom and operatively connected to the power source for adjustably controlling the weld current provided to the electrode tips. The controller is configured to incrementally increase the weld current from the power source by a first fixed amount between successive spot welds by the welder and configured to decrease the weld current by a second fixed amount when the voltage or resistance measured by the sensor corresponds to a spattered condition.

According to still another aspect, a welding control method is provided for adjustably controlling weld current during successive welding of a plurality of spot welds. In the method according to this aspect, a spatter condition is detected during welding of the plurality of spot welds. The weld current is decreased when the spattered condition is detected. Otherwise, the weld current is increased when indexing from one of the plurality of spot welds to the next of the plurality of spot welds.

According to a further aspect, an intelligent stepper method is provided for adjustably controlling weld current during successive welding of a plurality of spot welds. The method according to this aspect includes a) starting at a first weld location of the plurality of spot welds; b) sensing welding parameters prior to welding; c) determining whether a modification to at least one of weld current or cycle time is needed based on the welding parameters sensed; and d) if determined that a modification is needed in b), then determining whether spatter has occurred twice in succession. If spatter has not occurred twice in succession, at least one of the weld current or the cycle time is modified according to a first schedule. If spatter has occurred twice in succession, a determination is made as to whether spatter occurring twice in succession is a first occurrence. If a first occurrence, at least one of the weld current or the cycle time is modified according to a second schedule. If not a first occurrence, at least one of the weld current or the cycle time is modified according to a third schedule. The method further includes e) welding at the weld location; f) sensing a spatter condition; g) determining whether there is another of the plurality of spot welds to weld; and h) if determined that there is another of the plurality of spot welds to weld, then adjusting at least one of a base current and/or cycle time and returning to b).

DETAILED DESCRIPTION

Figure 1:
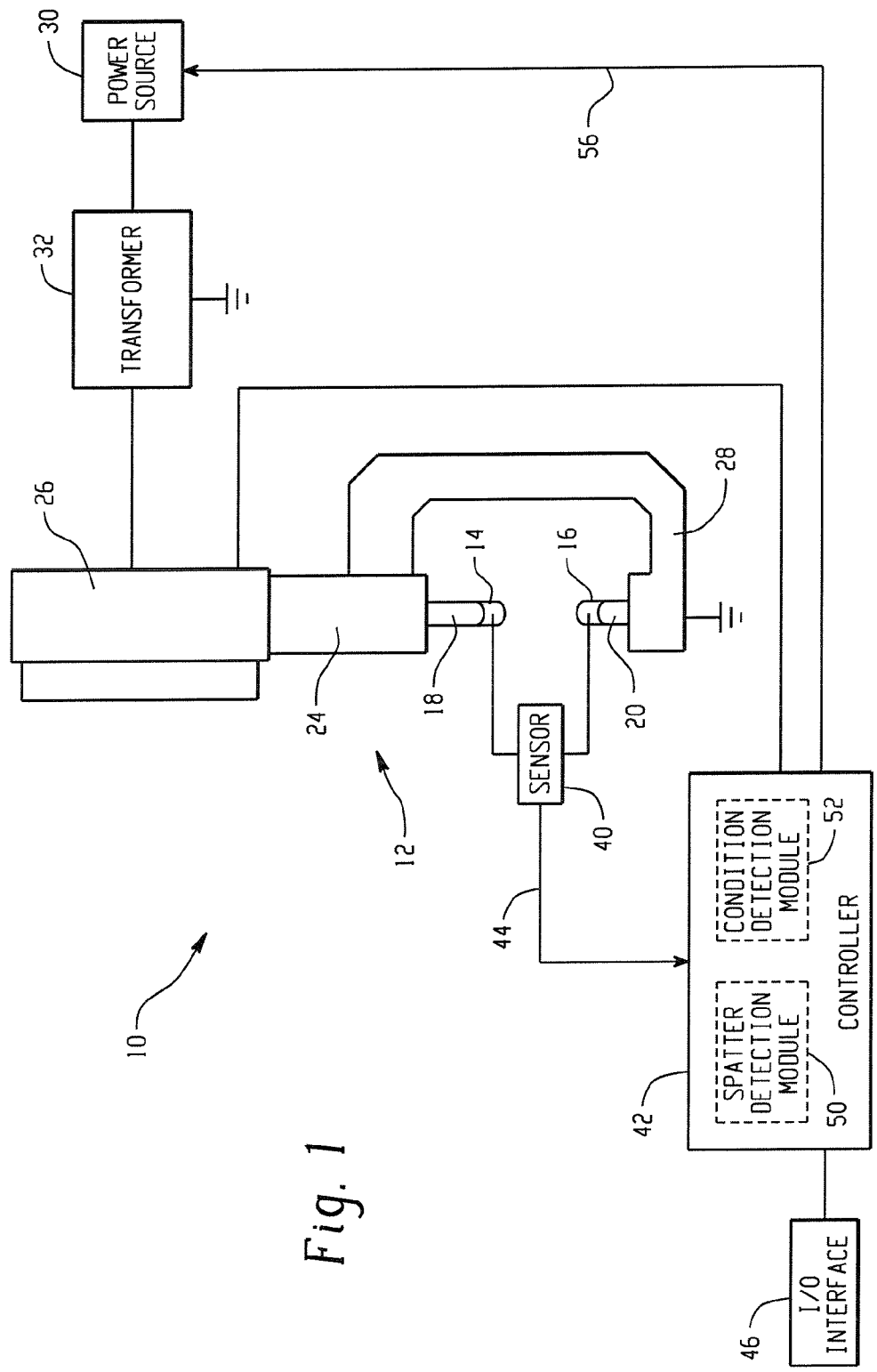
FIG. 1 is a schematic view of an intelligent stepper welding system.
Figure 2:
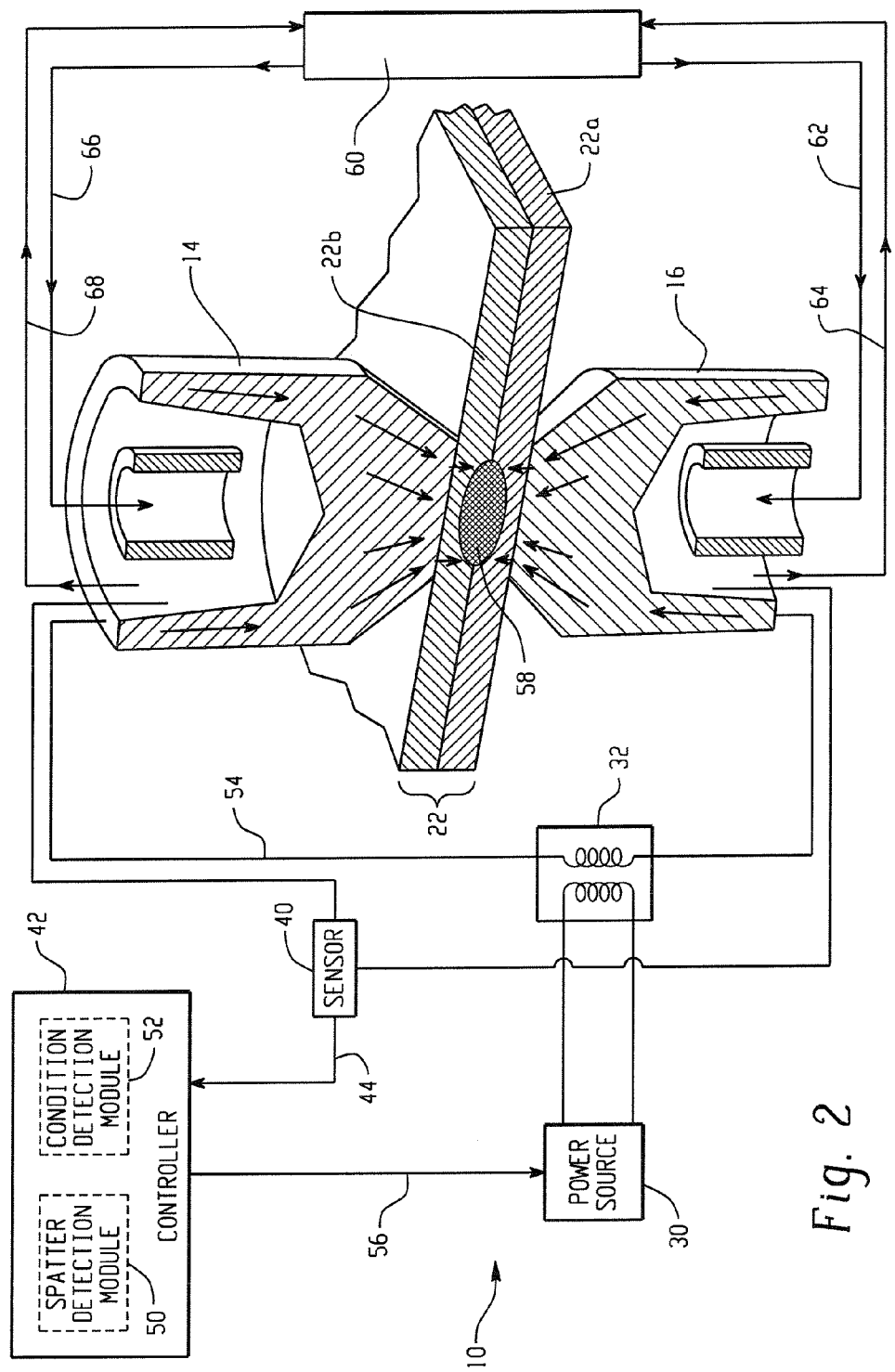
FIG. 2 is another schematic view of the intelligent stepper welding system.

Referring now to the drawings, wherein the showings are for purposes of illustrating one or more exemplary embodiments and not for purposes of limiting same, FIGS. 1 and 2 illustrate an exemplary intelligent stepper welding system generally designated by reference 10. The system 10 includes a resistance welder 12 having opposed electrode tips or electrodes 14, 16 for spot welding. As is known and understood by those skilled in the art, the welder 12 can be a robotic welding station of the type widely used, for example, in vehicle production lines.

In the illustrated embodiment, the welder 12 includes an upper holder arm 18 that holds the upper electrode 14 and a lower holder arm 20 that holds the lower electrode 16. In particular, the electrodes 14, 16 are mounted on free ends of the holder arms 18, 20 so that the electrodes 14, 16 can engage a work piece 22 (FIG. 2) with a predetermined squeezing force. The predetermined squeezing force can be applied by a ram 24 of a cylinder 26, such as a hydraulic or pneumatic cylinder. In the illustrated embodiment, the ram 24 is connected to the upper holder arm 18 to move the upper electrode 14 relative to the lower electrode 16. A clamp body 28 can connect the cylinder 26 to the lower holder arm 20. It is to be appreciated by those skilled in the art that the welder 12 depicted schematically in FIGS. 1 and 2 is merely illustrative and that other welder arrangements and types could be used.

A power source 30 is operatively connected to the welder 12, and particularly the electrode tips 14, 16, for providing the welding current thereto. In particular, the weld current from the power source 30 can be passed through a transformer 32 for converting high voltage, low current electricity from a utility into a high current, low voltage suitable for welding. While shown separately, it is to be appreciated that the power source 30 and the transformer 32 could be integrated into a single unit if desired, though this is not required.

The welding system 10 includes a sensor 40 for measuring a voltage or resistance between the electrode tips 14, 16 as will be described in more detail below. The welding system 10 can additionally include a controller 42 operatively connected to the sensor 40 for receiving a voltage or resistance signal 44 therefrom and operatively connected to the power source 30 for adjustably controlling the weld current provided to the electrode tips 14, 16. As will be described in more detail below, the controller 42 is configured to incrementally increase the weld current from the power source 30 by a first fixed amount or percentage between successive weld spots welded by the welder 12 and further configured to decrease the weld current by a second fixed amount or percentage when the voltage or resistance measured by the sensor 40 corresponds to a spatter condition.

An external input/output interface 46 can be operatively connected to the controller 42. The interface 46 could be, for example, a touch screen that displays various control parameters related to the welding operation and receives touch input to change some of these parameters. Alternatively, the interface 46 could be a combination monitor and keyboard, either integrally formed as one unit or separate units, or other types of input/output controls, displays, etc.

As will also be described in further detail below, the controller 42 can be further configured to initially increase the weld current from the power source 30 by a third fixed amount of percentage when an initial resistance between the electrode tips 14, 16 is high and to initially decrease the weld current from the power source 30 by a fourth fixed amount or percentage when the initial resistance between the electrode tips 14, 16 is low. The controller 42 can be further configured to modify, such as adjust downward, the third and fourth fixed amounts or percentages when a spatter condition is sensed for two successive spot welds.

Though not shown, the controller 42 can also include an internal input/output interface for sending and receiving signals with the various components of the system 10, including the sensor 40 and the power source 30. This internal input/output interface can include an input circuit having various functions including the function of shaping the wave forms of input signals (e.g., from the sensor 40) and a function of correcting the voltage of the input signals to a predetermined level, and a function of converting analog signal values into digital signal values. This input/output interface can also include an output circuit for supplying drive signals to the various components to the system 10, such as the power source 30. The controller 42 can additionally include a central processing unit (CPU) linked to the internal input/output interface and the external interface 46, and also linked to a memory or memory circuit including a ROM, which can preliminarily store various operational programs to be executed by the CPU, and a RAM for storing the results of the computations or the like by the CPU.

In particular, the controller 42 can have a spatter detection module 50 that detects a spatter condition by comparing a change in the voltage or resistance over a specified time period for a given spot weld to a predetermined change amount indicative of the spatter condition. The controller can also have a spot weld condition detection module 52 that detects a spot weld condition prior to substantive welding of a spot weld by: pulsing an initial current amount between the electrodes 14, 16 for a predetermined time period, and comparing the voltage or resistance measured by the sensor 40 between the electrode tips 14, 16 during the pulsing to a predetermined value to determine whether the initial resistance is high or low. These modules 50, 52 can be programs stored in the memory of the controller 42 and executed by the CPU of the controller 42.

As shown in FIG. 2, the electrodes, 14, 16 can engage the work piece 22 such as would occur during welding of the work piece 22. Accordingly, in operation, the ram 24 and cylinder 26 of FIG. 1 would be used to close the electrodes 14, 16 on the work piece 22. As illustrated, the work piece 22 could be two overlapping sheets of metallic material 22a, 22b that are being welded together such as would occur during assembly of a vehicle-in-white body. The controller 42 could control the welding operation by the electrodes 14, 16 by controlling a welding current 54 passed through the electrodes, 14, 16 from the power source 30. In particular, the controller 42 could send a command signal 56 (or signals) to the power source 30 for delivering the appropriate amount of the welding current 54 through the electrodes 14, 16. As already discussed, welding current from the power source 30 is stepped up and voltage is stepped down by the transformer 32. The electrodes 14, 16 pass the welding current 54 through the work piece 22 which, due to the resistance of the work piece 22, generates significant heat between sheets 22a, 22b of the work piece 22, ultimately resulting in a nugget 58 being formed. At the appropriate time, the welding current 54 can be stopped and the electrodes 14, 16 can be cooled via cooling system 60 which passes a cooling fluid, such as water, through the electrodes 14, 16 as indicated by lines 62, 64, 66, 68. This cools the nugget 58 and results in the pieces 22*a*, 22*b* being welded together.

Through the control module 50, a welding control method can be affected for adjustably controlling the weld current 54, particularly during successive welding of a plurality of weld spots. In particular, the module 50 detects a spatter condition in the work piece 22 during welding. This is done through the sensor 40 communicating via signal 44 with the controller 42. In particular, a change in voltage or resistance over a specified time for a given spot weld is measured by the sensor 40 and compared to a predetermined change amount indicative of a spatter condition. When the spatter condition is detected, the weld current 54 is decreased by the module 50. Otherwise, if no spatter condition is detected, the weld current 54 is increased by the module 50 when the system 10 indexes from one of a plurality of welds to the next of a plurality of welds.

Figure 3:
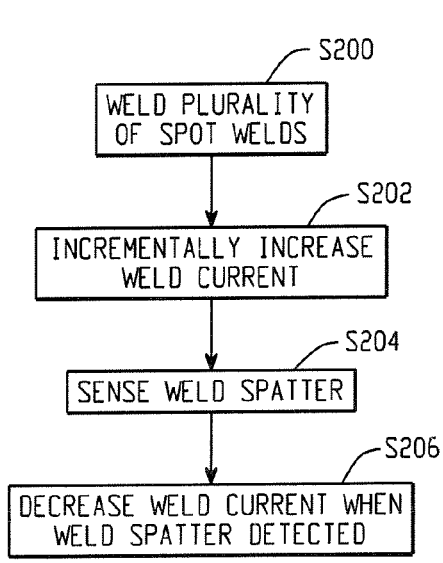
FIG. 3 is a process flow diagram of an intelligent stepper method for controlling weld current in a welding operation based on sensed spatter.

With reference now to FIG. 3, an intelligent stepper method for controlling weld current in a welding operation will now be described. In particular, the method of FIG. 3 will be described with reference to the stepper welding system 10 of FIGS. 1 and 2 though it is to be appreciated that the method could be used with other welding systems. In the stepper method, a plurality of spot welds are welded in succession (S200). This could include a number of welds on a particular vehicle body-in-white and/or repeat welds on several body-in-white assemblies on an assembly line. In one example, the plurality of spot welds are a given number of welds on a vehicle body-in-white that are repeated on a plurality of body-in-white assemblies (e.g., twenty welds on each vehicle body-in-white). The weld current used for welding the plurality of spot welds is incrementally increased by a first fixed amount or percentage at each of the plurality of spot welds (S202). This can compensate for deformation of the electrodes that occurs during welding at each of the plurality of spot welds.

In the stepper system 10, the controller 42 commands the power source 30 to deliver increased weld current by the first fixed amount or percentage via command signal 56. During the welding of each of the plurality of weld spots, weld spatter is sensed at each of the plurality of weld spots (S204). Sensing weld spatter can include monitoring a resistance or voltage between the electrode tips, 14, 16. In particular, sensor 40 can monitor the resistance or voltage between the electrode tips 14, 16 and communicate this sensed or monitored resistance or voltage via signal 44 to the controller 42. Such monitoring of the resistance or voltage between the electrode tips can further include monitoring for a significant change in the resistance or voltage between the electrode tips 14, 16 during welding at each of the plurality of spot welds.

More particularly, as already discussed herein, module 50 of the controller 42 can determine a voltage or resistance change as measured by the sensor 40 over a fixed amount of time (e.g., the time during which welding current is delivered to the electrodes 14, 16 to weld the work piece 22). The change in voltage or resistance can then be compared to a fixed amount to determine if the change is a significant change which would be indicative of weld spatter. When weld spatter is sensed in S204, the weld current can be decreased by a second fixed amount or percentage in S206. Decreasing of the weld current in S206 can occur immediately during welding at one of the plurality of spot welds or simply before welding of the next spot weld. Either way, by this method, a spatter condition can be sensed or detected during welding of the plurality of spot welds. When the spatter condition is detected in S204, the weld current can be decreased in S206; otherwise, the weld current can be increased when indexing from one of the plurality of spot welds to the next of the plurality of spot welds. In addition to decreasing weld current when weld spatter is sensed in S206, cycle time can be optionally increased by a cycle time fixed amount such as 20% for example.

By way of example, the first fixed amount or percentage can be 0.065% or approximately 5 amperes per weld. Also for example, the second fixed amount or percentage can be 1.25% or approximately 100 amperes. Incrementally increasing the weld current between spot welds can account for tip face growth of the electrodes 14, 16, improper tip dressing, and/or some other poor parameters. Decreasing the weld current when weld spatter is sensed can prevent over increasing the current and causing a constant spatter mode. In one embodiment, the weld current is decreased in S206 by the second fixed amount or percentage (e.g., 1.25% or approximately 100 amperes) only when weld spatter is sensed in S204 at two successive spot welds of the plurality of spot welds. This can account for a spatter condition occurring that is not entirely related to the weld current.

Figure 4:
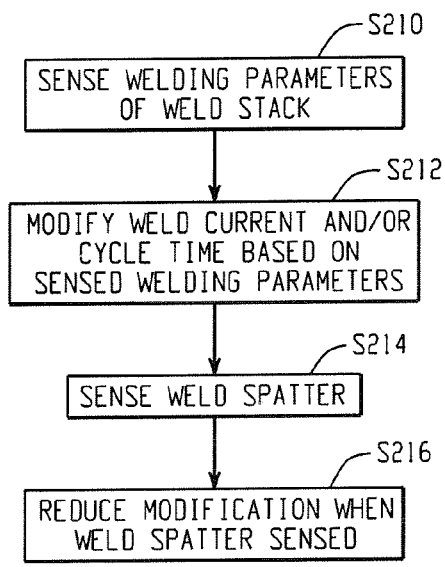
FIG. 4 is a process flow diagram of a further intelligent stepper method for further controlling weld current in a welding operation based on welding parameters of a welding work piece.

With additional reference to FIG. 4, a stepper method is shown for determining whether certain welding parameters should be adjusted or modified based on welding parameters of a weld stack (i.e., work piece 22). The method of FIG. 4 can be used in combination with the method of FIG. 3 or separately. More particularly, in FIG. 4, weld parameters of a weld stack can be sensed at each of the plurality of spot welds prior to welding the weld stack (S210). At least one of weld current and/or cycle time can then be modified based on the sensed weld parameters of the weld stack (S212). Sensing the welding parameters in the weld stack in S210 can first include closing the electrodes 14, 16 on the work piece 22 to a specified force. A weld timer can then be activated and weld pulses at a specific current for a specific time can be generated to determine the welding parameters of the weld stack. For example, resistance of the weld stack can be determined by delivering a pulsed weld current through the work piece and measuring the resistance between the electrodes 14, 16 by the sensor 40. Accordingly, sensing the weld parameters of the weld stack in S210 can include measuring a voltage of resistance through the weld stack prior to substantive welding of the weld stack.

Modifying the weld current and/or cycle time in S212 can include the weld current being decreased by a third fixed amount or percentage when resistance in the weld stack is determined to be high and the weld current being increased by a fourth fixed amount or percentage when the resistance in the weld stack is determined to be low. By way of example, the third fixed amount or percentage can be 2% and likewise the fourth fixed amount or percentage can be 2%, though the amounts/percentages can vary and need not be equal to one another. Also, cycle time for the electrodes 14, 16 before a tip redress can be increased by a cycle time fixed amount or percentage when the resistance through the weld stack is determined to be high. The cycle time fixed amount or percentage can be 20% for example, though other values can be used. These modifications occurring in S212 can overcome issues affecting individual welds such as gap, sealer, lot-to-lot variations, etc.

Optionally, the third and fourth fixed amounts or percentages of S212 can be adjusted downward when weld spatter is sensed, such as at two successive spot welds on the plurality of spot welds. In this instance, weld spatter can be sensed at S214, which can occur simultaneous with or be the same as sensing weld spatter in S204 of FIG. 3. When weld spatter is sensed in S214, the third and fourth fixed amounts or percentages can be adjusted downward (S216). Thus, the modification occurring in S212 can be reduced. If desired, the third and fourth fixed amounts or percentages can be adjusted downward in S216 a greater amount upon a second occurrence of weld spatter being sensed at two successive spot welds of the plurality of spot welds. In a further option, the third and fourth fixed amounts or percentages are adjusted downwardly is S216 only when weld spatter is sensed in S214 at two successive spot welds and no weld spatter is sensed at both a spot weld immediately before the two successive spot welds and a spot weld immediately after the two successive spot welds.

Figure 5:
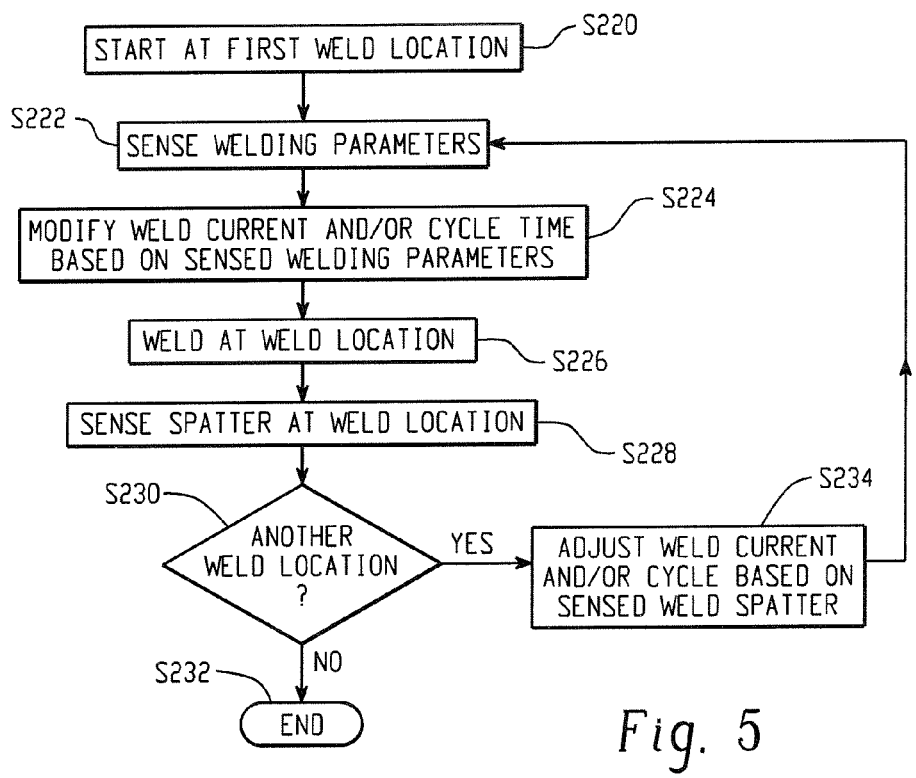
FIG. 5 is a process flow diagram of an intelligent stepper method for controlling weld current based on sensed spatter and welding parameters of a welding work piece.

With reference to FIG. 5, an intelligent stepper method will be described that employs the incrementally increasing weld current and selective decreasing weld current when weld spatter is sensed from the method of FIG. 3 and includes the modifications to weld current and/or cycle time based on sensed welding parameters of the method of FIG. 4. The method of FIG. 5 will be described with particular reference to the intelligent welding stepper system 10 of FIGS. 1 and 2, though it is to be appreciated and understood that the method could be used with other welding systems. In FIG. 5, the welder 12 starts at a first weld location (S220). Next, welding parameters are sensed in S222 as described in reference to S210 of FIG. 4. Weld current and/or cycle time are modified based on the sense welding parameters in S224, which can be as described in reference to S212 of FIG. 4.

Next, the welder 12 welds at the weld location (S226). Spatter at the weld location can be sensed (S228). This can occur as described in reference to S204 of FIG. 3. Next, a determination can be made at S230 as to whether there is another weld location for welding. This determination can be made based on whether a scheduled tip redress is to occur. If there is no other weld location, the method ends at S232. However, if there is a another weld location to be welded before a tip redress, the method progresses to S234 wherein the weld current and/or cycle time are adjusted based on the sensed weld spatter. Where no weld spatter is sensed, the weld current can be incrementally increased as described in S202 of FIG. 3. If weld spatter is detected, the weld current can be decreased as described in S206 of FIG. 3 and/or cycle time can be increased. In addition, the modifications to the weld current and/or cycle time in S224 can be reduced as described in S216 of FIG. 4.

Optionally, any weld spatter sensed at each of the plurality of spot welds can be tracked. Also, weld current can be adjusted based on such tracking of weld spatter over a predefined plurality of the plurality of weld spots. Accordingly, trending can be used to adjust the weld current and/or cycle time to optimize weld current at each of the plurality of weld spots.

Figure 6:
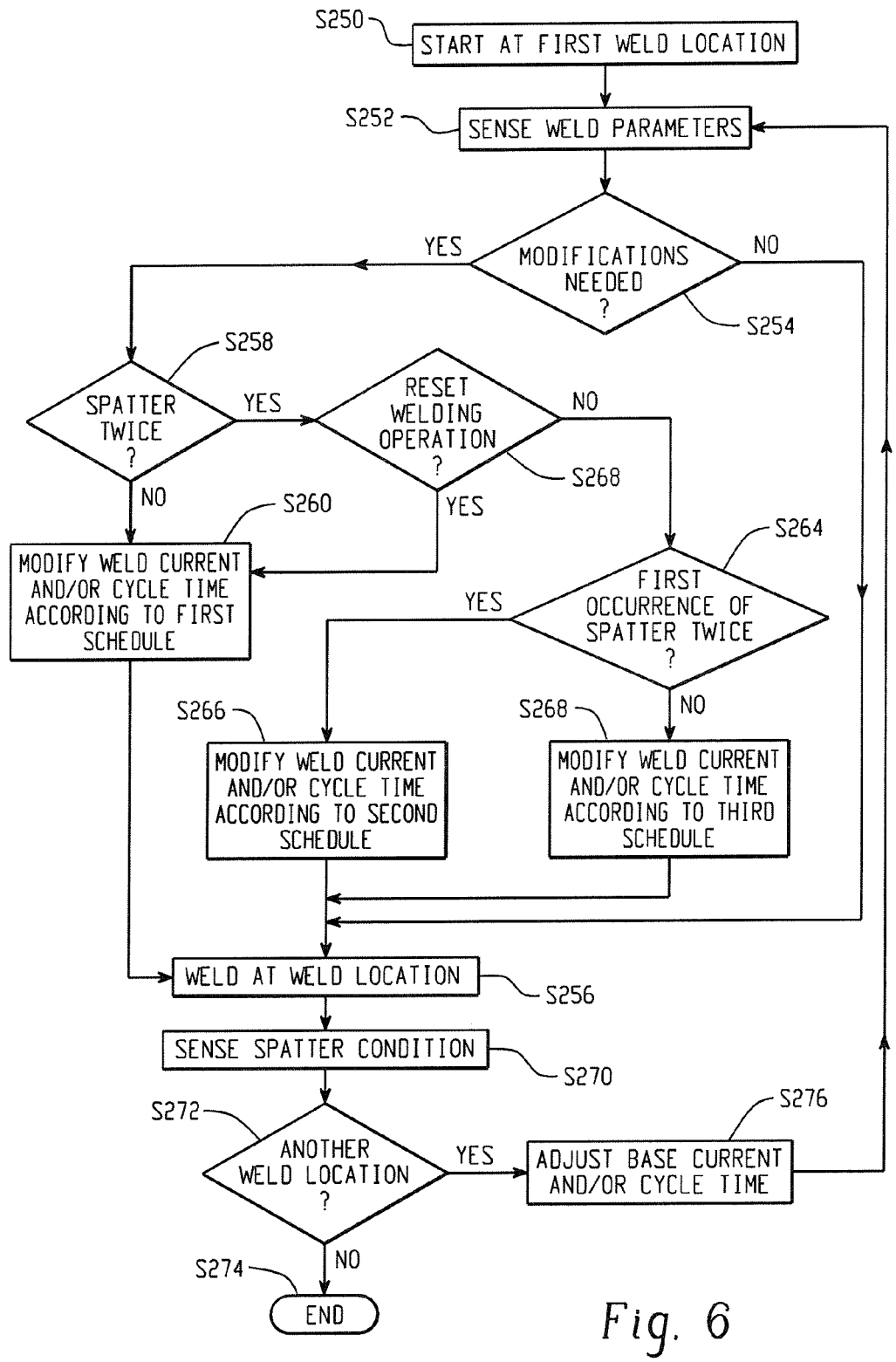
FIG. 6 is a process flow diagram of an intelligent stepper method for controlling weld current according to an alternate embodiment.

With reference to FIG. 6, another intelligent stepper method is illustrated. The method of FIG. 6 will be described in reference to the stepper welding system of FIGS. 1 and 2 though it is to be appreciated that other welding systems could be used. In FIG. 6, the welder 12 starts at a first weld location (S250) of a plurality of weld locations. Weld parameters of the first weld location are sensed at S252. This sensing can be as described in reference to S210 of FIG. 4. Next, in S254 a determination is made as to whether a modification to the welding current and/or cycle time is needed based on the weld parameters sensed in S252.

If no modification is needed, the method advances to S256 and the welder 12 welds the work piece at the weld location using a base weld current (e.g., 8,000 amperes). If a modification is needed, a determination is made as to whether a spatter condition has occurred twice in S258. If spatter has not occurred twice in S258, weld current and/or cycle time can be modified according to a first schedule (S260). In one example, the first schedule can include increasing amperage by 2.5% when resistance of the work piece is determined to be low and decreasing the weld current 1.5% when the resistance is determined to be high. Cycle time can also be increased in the first schedule when resistance is determined to be high. Then the method advances to S256 where welding at the weld location would occur according to the modifications made in S258 according to the first schedule.

If spatter is determined to have occurred twice in succession in S258, then a determine is made in S262 as to whether the welding operation should be reset. A reset occurs after a tip change or when no spatters have occurred for a predetermined number of spot welds (e.g., 5 spot welds). If there is no reset in S262, a determination is made in S264 as to whether the spatters occurring twice is a first occurrence. If yes, weld current and/or cycle time are modified in S266 according to a second schedule. By way of example, the second schedule can include increasing amperage 1.5% when resistance is low and decreasing amperage 2% when the resistance is high and/or increasing cycle time by 20%. When determined that the spatter occurring twice is not a first occurrence in S264, weld current and/or cycle time can be modified according to a third schedule in S268. In the third schedule, for example, weld current can be increased 1% when resistance is low and decreased 2.5% when the resistance is high and/or cycle time can be increased 20%.

At S256, welding occurs at the weld location in S256 according to the appropriate schedule (S260, S266 or S268) or the base amperage is used if no modifications are made. During the welding in S256, spatter conditions are sensed in S270. This can occur as discussed in reference S204 of FIG. 3. Next, at S272, a determination is made as to whether to advance to another weld location. If no, the method ends at S274, such as might occur when tip redress is needed or the last body-in-white vehicle is reached on an assembly line. If there is another weld location as determined in S270, the method advances to S276 wherein the base weld current and/or cycle time is adjusted. This can occur as described in reference to S220 and S206 of FIG. 3. More particularly, weld current can be incrementally increased if weld spatter was not sensed in S270. If weld spatter was sensed, weld current can be decreased. Optionally, decreasing of weld current can occur during welding in S256 when a spatter condition is sensed. After the base current and/or cycle time is adjusted in 5276, the method reverts to S252 where weld parameters are sensed of the next spot weld location and the method repeats.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An intelligent stepper method for controlling weld current in a welding operation, comprising:
   welding a plurality of spot welds in succession;
   incrementally increasing the weld current by a first fixed amount or percentage at each of the plurality of spot welds;
   sensing welding parameters of a weld stack at each of the plurality of spot welds prior to welding the weld stack; and modifying at least one of weld current or cycle time based on the sensed weld parameters of the weld stack at each of the plurality of spot welds prior to welding the weld stack;

sensing weld spatter at each of the plurality of spot welds; and decreasing the weld current by a second fixed amount or percentage when weld spatter is sensed.

2. The intelligent stepper method of claim 1 wherein decreasing the weld current by the second fixed amount or percentage only occurs when weld spatter is sensed at two successive spot welds of the plurality of spot welds.

3. The intelligent stepper method of claim 1 wherein sensing weld spatter includes monitoring a resistance or voltage between electrode tips.

4. The intelligent stepper method of claim 1 wherein monitoring a resistance or voltage between the electrode tips includes monitoring for significant change in the resistance or voltage between the electrode tips during welding at each of the plurality of spot welds.

5. The intelligent stepper method of claim 1 wherein sensing the welding parameters of the weld stack includes measuring a voltage or resistance through the weld stack at each weld location prior to substantive welding of the weld stack at each location.

6. The intelligent stepper method of claim 1 wherein modifying at least one of the weld current or cycle time to include modifying the weld current and wherein modifying the weld current based on the sensed weld parameters includes:

increasing the weld current by a third fixed amount or percentage when resistance in the weld stack is determined to be high; and decreasing the weld current by a fourth fixed amount or percentage when the resistance in the weld stack is determined to be low.

7. The intelligent stepper method of claim 6 wherein modifying the weld current based on the sensed weld parameters further includes:

increasing cycle time by a cycle time fixed amount or percentage when the resistance is determined to be high.

8. The intelligent stepper method of claim 6 wherein the third and fourth fixed amounts or percentages are adjusted downward when weld spatter is sensed at two successive spot welds of the plurality of spot welds.

9. The intelligent stepper method of claim 8 wherein the third and fourth fixed amounts or percentages are adjusted downward a greater amount upon a second occurrence of weld spatter being sensed at two successive spot welds of the plurality of spot welds.

10. The intelligent stepper method of claim 8 wherein the third and fourth fixed amounts or percentages are adjusted downwardly only when weld spatter is sensed at two successive spot welds and no weld spatter is sensed at both a spot weld immediately before the two successive spot welds and a spot weld immediately after the two successive spot welds.

11. The intelligent stepper method of claim 1 wherein decreasing the weld current occurs immediately during welding at one of the plurality of spot welds.

12. The intelligent stepper method of claim 1 wherein cycle time is increased by a cycle time fixed amount when weld current is decreased.

13. The intelligent stepper method of claim 1 further including:

tracking any weld spatter sensed at each of the plurality of spot welds; and adjusting weld current based on the weld spatter tracked over a predefined plurality of the plurality of spot welds.

14. An intelligent stepper welding system, comprising:

a resistance welder having opposed electrode tips for spot welding;

a power source operatively connected to the electrode tips for providing a weld current thereto;

a sensor for measuring a voltage or resistance between the electrode tips; and a controller operatively connected to the sensor for receiving a voltage or resistance signal therefrom and operatively connected to the power source for adjustably controlling the weld current provided to the electrode tips, the controller configured to incrementally increase the weld current from the power source by a first fixed amount between successive spot welds by the welder and configured to decrease the weld current by a second fixed amount when the voltage or resistance measured by the sensor corresponds to a spatter condition, wherein the controller is further configured to initially increase the weld current from the power source by a third fixed amount or percentage when an initial resistance between the electrode tips is high and to initially decrease the weld current from the power source by a fourth fixed amount or percentage when the initial resistance between the electrode tips is low.

15. The system of claim 14 wherein the controller has a spatter detection module that detects the spatter condition by comparing a change in the voltage or resistance over a specified time period for a given spot weld to a predetermined change amount indicative of the spatter condition.

16. The system of claim 14 wherein the controller is further configured to adjust downward the third and fourth fixed amounts or percentages when the spatter condition is sensed for two successive spot welds.

17. The system of claim 14 wherein the controller has a spot weld condition detection module that detects a spot weld condition prior to substantive welding of a spot weld by:

pulsing an initial current amount between the electrodes for a predetermined time period; and comparing the voltage or resistance measured by the sensor between the electrode tips during the pulsing to a predetermined value to determine whether the initial resistance is high or low.

18. A welding control method for adjustably controlling weld current during successive welding of a plurality of spot welds, comprising:

detecting a spatter condition during welding of the plurality of spot welds;

decreasing the weld current and increasing cycle time when the spatter condition is detected; and otherwise increasing the weld current when indexing from one of the plurality of spot welds to the next of the plurality of spot welds.

19. An intelligent stepper method for adjustably controlling weld current during successive welding of a plurality of spot welds, comprising:

a) starting at a first weld location of the plurality of spot welds;

b) sensing welding parameters prior to welding;

c) determining whether a modification to at least one of weld current or cycle time is needed based on the welding parameters sensed;

d) if determined that a modification is needed in b), then determining whether spatter has occurred twice in succession;

if spatter has not occurred twice in succession, modifying at least one of the weld current or the cycle time according to a first schedule, and if spatter has occurred twice in succession, determining whether spatter occurring twice in succession is a first occurrence;
  if a first occurrence, modifying at least one of the weld current or the cycle time according to a second schedule, and
  if not a first occurrence, modifying at least one of the weld current or the cycle time according to a third schedule;
e) welding at the weld location;
f) sensing a spatter condition;
g) determining whether there is another of the plurality of spot welds to weld; and
h) if determined that there is another of the plurality of spot welds to weld, then adjusting a base current and/or cycle time and returning to b).

20. The intelligent stepper method of claim 19 further including:
  determining whether the welding operation is to be reset after determined that spatter has occurred twice in succession in c); and
  if the welding operation is to be reset, modifying the weld current or the cycle time according to the first schedule and advancing to d).

* * * * *